Aug. 31, 1943.   A. J. FILKINS   2,328,332
DAMPER
Filed March 27, 1940

INVENTOR.
Arthur J. Filkins
BY Kent W. Wonnell
ATTORNEY.

Patented Aug. 31, 1943

2,328,332

UNITED STATES PATENT OFFICE 2,328,332

DAMPER

Arthur J. Filkins, Chicago, Ill., assignor to Paul Dickinson, Inc., Chicago, Ill., a corporation of Illinois Application March 27, 1940, Serial No. 326,227

4 Claims. (Cl. 98—85)

This invention relates in general to a damper for pipes and passages and is more particularly described as a pipe damper for a roof ventilator.

An important object of the invention is in the provision of a damper which may be accurately controlled, regulated and held in any adjusted position.

A further object of the invention is in the provision of a damper provided with a quickly and easily operated ratchet mechanism for opening and closing the damper.

A further object of the invention is in the provision of a counterbalance damper which is easily operated by directly attached cords, the depending ends of which are located relatively close together so that they will indicate at a glance the relative amount the damper is open or closed.

Other and further objects of the invention will appear hereinafter, a preferred embodiment of the invention being shown in the accompanying drawing in which Figure 1 is a top view showing a ventilator of this type attached to a square pipe and in closed position;

Figure 1:
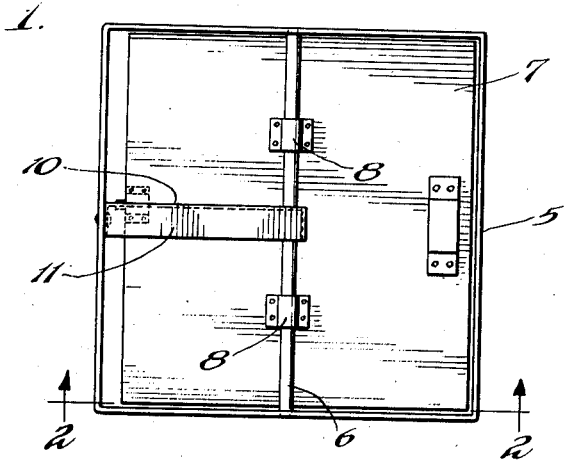

It is often desirable to regulate the action of roof ventilators, particularly during cold weather or during high wind velocities and at various other times for maintaining desired heat and atmospheric conditions within a building. This invention proposes a counterweighted damper preferably located in the throat of a ventilator, having a ratchet attachment operated by centrally located cords which are easily and quickly manipulated to regulate the position of the damper.

Referring now more particularly to the drawing, a square ventilator pipe 5 is shown to which this damper is applied by means of a transverse shaft 6 extending between opposite walls thereof, but a similar construction may be applied to round pipes or passages of various shapes, it being necessary only to shape the damper accordingly.

Rotatably mounted or with the shaft 6 is a damper plate 7 having attaching straps or pivoting clips 8 for mounting it on the shaft. The size and shape of the plate depends upon the shape and size of the ventilator pipe, the plate being adapted to substantially close the pipe when it is disposed in transverse position therein.

Attached to the inside of the pipe by rivets 9 or other suitable fastening devices is a ratchet plate 10, the edges 11 of which are turned at right angles to the plate for providing additional rigidity. This plate extends at right angles to the shaft 6 and the inner free end of the plate is over the center of the pipe or over the center of the shaft, forming a curved quadrant having ratchet teeth 12 in the edge thereof with the shaft 6 as the center of curvature. At the upper end of the tooth portion is a stop 13 and at the bottom of the tooth portion is a stop 14 for engaging and limiting the movement of the damper plate in both directions.

The teeth of the ratchet plate 10 are disposed downwardly in the quadrant and at the adjacent edge of the damper plate is a latch 15 slidably mounted in a casing 16 attached to the under side of the plate and having a stem 17 extending through and out of the casing at the side opposite the edge of the plate. Within the casing and surrounding the stem is a spring 18 tending to force the latch outwardly and into engagement with the teeth 12, the spring permitting the latch and the plate to move in one direction but engaging the teeth in the other direction of movement. Attached to the stem outside of the casing is a collar 19 to limit the movement of the latch as urged by the spring 18 and attached to the outer end of the stem is a pull cord 20. This pull cord extends beyond the center of the plate and under a fastening clip 21 with the extremity of the cord depending below the ventilator pipe where it is accessible. Attached to a clip 22 at the other side of the plate nearer the latch is a closing cord 23 and the extremities of these cords are disposed close together so that they can be easily engaged and manipulated by an operator.

Figure 2:
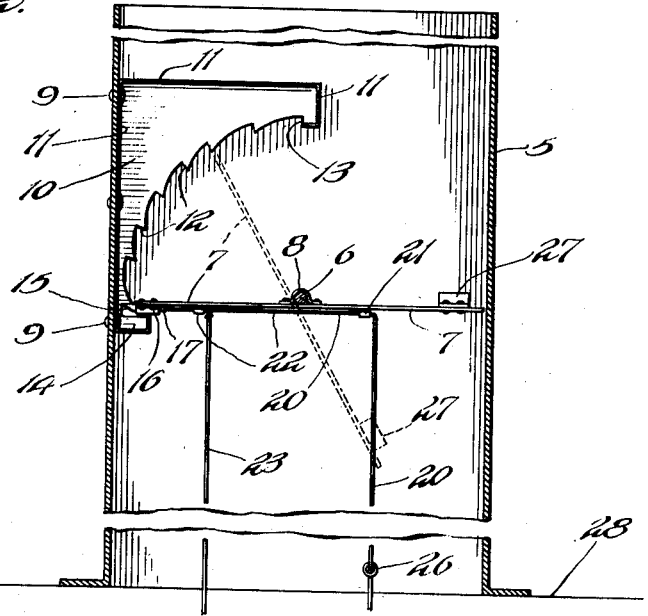
Figure 2 is a sectional elevation taken on the line 2—2 of Figure 1.
Figure 3:
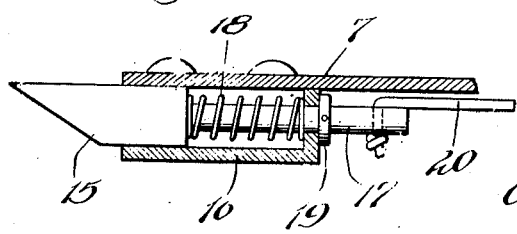
Figure 3 is a sectional detail illustrating a locking latch.

One of the cords 23 is the closing cord having a suitable designation 24 at the lower end and the other is the opening cord having a knob or suitable designation 25 at the lower end thereof. If desired a marker 26 may be placed on one of the cords at a distance from the extremity thereof to show the relative amount that the damper is opened. For example, when the damper is entirely closed as shown in Figure 2, the markers 24 and 25 or the extremities of the cords would be at the same heighth and when the opening cord is pulled to open the draft to the pullest extent the markers 24 and 26 would be at the same heighth. In an intermediate position the marker 24 is intermediate the markers 25 and 26.

In order to insure that the damper will be held against the teeth 12 and the stop 13 a counterweight 27 is secured to the plate at the side opposite the latch 16 which tends to hold the latch 15 against the teeth and the stop at all times, and when the closing cord 23 is pulled the plate is rotated against the counterweight, the latch sliding over each of the teeth in succession until the plate is located at the desired inclination whereupon the counterweight will hold the latch against the tooth last passed. In order to open the damper, pulling on the cord 20 first withdraws the latch from engagement with the teeth against its spring 18 whereupon the plates may be rotated, and by manipulating both cords at the same time the damper plate can be set in any inclined position.

Figure 4:
Figure 4 shows a modification of the latch operating means.

A modification of the latch operating means is shown in Fig. 4, which comprises a link 30 pivoted at one end to the stem 17 of the latch 16 and pivoted at the other end intermediate the ends of a lever 31. This lever is pivoted at its upper end to the under side of the damper plate 7 and has a pull cord 32 attached to its outer or free end. The latch spring tends to pull the lever up, and pulling on the cord 32 withdraws the latch for moving the plate as desired.

While it is intended that this damper is preferably located in the throat of a ventilator just above a ceiling line 28, it is apparent that the damper may be variously placed wherever desired and although particularly intended for a vertical ventilator pipe a similar damper may also be located in a horizontal pipe or passage where it is similarly actuated and operated.

I claim:

1. A pipe damper comprising a damper plate centrally pivoted in the pipe, having a spring latch projecting from one edge, a ratchet plate secured to the inside of the pipe projecting at right angles to the damper plate and overlying the central pivot with the edge of the plate in a curved path having teeth to engage the latch in its upward direction of movement and having end projections to limit the movement of the damper plate to ninety degrees, and means for withdrawing the latch from the teeth and rotating the damper plate in either direction.

2. A damper comprising a plate centrally pivoted, a spring latch projecting at one end of the plate, a segment with one edge having teeth in a curved path to engage the latch as the plate is rotated, and means to rotate the plate comprising a depending cord secured at one end to the latch extending beyond the pivot and having a clip at the same side of the plate through which it is movable, and a second depending cord secured to the plate between the latch and its pivot.

3. In a damper comprising a plate centrally pivoted with a spring latch projecting from one edge, a segment with teeth to engage the latch in a curved path with means at the ends to limit the movement of the plate to an angle of ninety degrees, and means attached to the latch and plate and depending at opposite sides of the pivot for controlling the rotation and positioning of the plate.

4. A damper comprising a centrally pivoted plate, having a spring pressed latch projecting at one edge, a ratchet plate having teeth in a curved path at right angles to the damper plate, means on the ratchet plate at the ends of the path to engage and limit the movement of the damper plate to ninety degrees, and flexible means attached to the latch and pivoted plate and depending from opposite sides of the pivot for rotating and positioning the plate in the ratchet plate.

ARTHUR J. FILKINS.